US009815481B2

United States Patent
Goldman-Shenhar et al.

(10) Patent No.: US 9,815,481 B2
(45) Date of Patent: Nov. 14, 2017

(54) VEHICLE-USER-INTERACTION SYSTEM

(71) Applicant: GM Global Technology Operations LLC, Detroit, MI (US)

(72) Inventors: Claudia V. Goldman-Shenhar, Jerusalem (IL); Eric L. Raphael, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 101 days.

(21) Appl. No.: 14/868,033

(22) Filed: Sep. 28, 2015

(65) Prior Publication Data

US 2017/0088143 A1 Mar. 30, 2017

(51) Int. Cl.
| | |
|---|---|
| *G01C 22/00* | (2006.01) |
| *G05D 1/00* | (2006.01) |
| *G01M 17/00* | (2006.01) |
| *B60W 50/08* | (2012.01) |
| *B60K 35/00* | (2006.01) |
| *G06F 3/00* | (2006.01) |

(52) U.S. Cl.
CPC ............ *B60W 50/08* (2013.01); *B60K 35/00* (2013.01); *G05D 1/0088* (2013.01); *G06F 3/00* (2013.01); *B60K 2350/1028* (2013.01); *B60K 2350/1052* (2013.01); *B60K 2350/967* (2013.01)

(58) Field of Classification Search
CPC ..... G05D 1/0088; B60K 35/00; B60W 50/14; B60W 50/08
USPC .......................... 701/23; 340/425.5, 463, 465
See application file for complete search history.

(56) References Cited

U.S. PATENT DOCUMENTS

| | | | |
|---|---|---|---|
| 8,670,891 B1* | 3/2014 | Szybalski | B62D 1/286 701/23 |
| 9,132,840 B1* | 9/2015 | Szybalski | B60W 50/14 |
| 2015/0149088 A1* | 5/2015 | Attard | G01C 21/36 701/538 |

OTHER PUBLICATIONS

National Highway Traffic Safety Administration, "Key Considerations in the Development of Driving Automation Systems", Paper No. 15/0451; www-esv.nhtsa.dot.gov/proceedings/24/files/24ESV-000451.PDF.

(Continued)

*Primary Examiner* — Isaac Smith
(74) *Attorney, Agent, or Firm* — Mickki D. Murray; Parks IP Law LLC

(57) ABSTRACT

A system, for use at an autonomous-driving-capable vehicle, including a processing hardware unit and a tangible interface device. The system further includes a mode-determining module configured to, via the processing hardware unit, determine an applicable interaction mode corresponding to a driver of the autonomous-driving-capable vehicle. The system also includes an interaction module configured to, via the processing hardware unit, perform various operations. The operations include generating system messages having content based on the applicable interaction mode determined and related to autonomous-driving activities of the vehicle. The operations also include transmitting, by way of the tangible communication device, the system messages to a tangible interface device of the autonomous-driving-capable vehicle for communication to the driver by way of the tangible output device.

20 Claims, 4 Drawing Sheets

(56) References Cited

OTHER PUBLICATIONS

Tannert, Chuck, "Self-Driving Cars: Inside the Road to Revolution", Innovation Agents, Jan. 8, 2014, pp. 1-12.
National Highway Traffic Safety Administration, "U.S. Department of Transportation Releases Policy on Automated Vehicle Development", Paper No. 14-13, Aug. 11, 2015.

* cited by examiner

Fig_2

VEHICLE-USER-INTERACTION SYSTEM

TECHNICAL FIELD

The present disclosure relates generally to autonomous-driving-capable vehicles and, more particularly, to a vehicle-user-interaction system for autonomous-driving-capable vehicles.

BACKGROUND

Manufacturers are increasingly producing vehicles with higher levels of driving automation. Features such as adaptive cruise control and lane keeping have become popular and are precursors to greater adoption of fully autonomous-driving-capable vehicles.

While availability of autonomous-driving-capable vehicles is on the rise, users' familiarity and comfort with these functions will not necessarily keep pace. User trust in the automation is an important aspect in overall technology adoption.

Lack of trust in automated-driving functionality usually leads to reduced use of the system, such as by the user not engaging, or disengaging, autonomous-driving operation. Lack of trust can also keep the user from becoming aware of, or using, more advanced autonomous-driving capabilities.

Levels of adoption can also affect marketing and sales of autonomous-driving-capable vehicles. As users trust autonomous-driving systems more, they are more likely to purchase an autonomous-driving-capable vehicle and recommend, or model use of, one to others.

SUMMARY

The present disclosure relates to a vehicle-user-interaction system, for use at an autonomous-driving-capable vehicle. The vehicle-user-interaction system is configured and arranged in the vehicle to interact with the user at a custom level corresponding to the user.

The interactions are in various embodiments customized for the user based on an interaction mode associated with the user. The applicable interaction mode can be established in a variety of ways. In one embodiment, the user selects the interaction mode expressly, such as by way of a human-machine interface (HMI) of the vehicle. In one embodiment, the vehicle-user-interaction system determines the applicable interaction mode for the user based on factors such as user settings, user communications, or other behavior of the user.

Generally, the system is configured to interact more with users who have requested or would apparently benefit most from higher levels of interaction and, conversely to interact less with users who have requested or would apparently benefit most from less levels of interaction. The interaction can include monitoring the user for express communications (e.g., voice statements) or implied communications (e.g., gestures or utterances), and providing information to the user (e.g., advance notice of a maneuver planned, or explanation of a maneuver performed) in order to promote user understanding with, trust in, and effective use of autonomous driving functions. The system is in various embodiments configured to sense any of a wide variety of communication types, such as by tactile or touch, audio, or visual sensors.

In one aspect, the system includes a processing hardware unit and a tangible communication device. The system also includes a mode-determining module configured to, via the processing hardware unit, determine an applicable interaction mode corresponding to a driver of the autonomous-driving-capable vehicle, and an interaction module. The interaction module is configured to, via the processing hardware unit, generate system messages comprising content based on the applicable interaction mode determined and related to autonomous-driving activities of the vehicle. The activities can include context of driving and in some embodiments qualities of the driver (e.g., their experience level or comfort with autonomous-driving functions), weather, traffic, the like, or other. The interaction module is also configured to, via the processing hardware unit, transmit, by way of the tangible communication device, the system messages to a tangible interface device of the autonomous-driving-capable vehicle for communication by way of the tangible interface device.

In various embodiments, the system further includes the tangible interface device of the autonomous-driving-capable vehicle.

The tangible interface device can include at least one component selected from a group consisting of a display-screen component, a heads-up display unit, and an audio-speaker component.

In one embodiment, the mode-determining module, in being configured to determine the applicable interaction mode corresponding to the driver of the autonomous-driving-capable vehicle, is configured to select the applicable interaction mode from a plurality of pre-established interaction modes.

In various embodiments, the mode-determining module, in being configured to select the applicable interaction mode from a plurality of pre-established modes, is configured to select the mode based on a user input received at a tangible input component selected from a group consisting of a knob, a dial, a touch-sensitive display, and a microphone.

The plurality of pre-established interaction modes include at least three modes, the pre-established interaction modes comprise a fully-manual driving mode, a first autonomous-driving interaction mode of the pre-established interaction modes is associated in the system to a highest level of interaction for autonomous driving, and a maximum autonomous-driving interaction mode of the pre-established interaction modes is associated in the system to a lowest level of interaction for autonomous driving.

The interaction module is configured in various embodiments to, in connection with the lower interaction modes, corresponding to higher levels of interaction, at least one of (i) monitor driver feedback more frequently, (ii) generate and transmit, by way of the processing hardware unit and the tangible interface device, messages more frequently, (iii) generate and transmit, by way of the processing hardware unit and the tangible interface device, more information by way of the messages, and (iv) generate and transmit, by way of the processing hardware unit and the tangible interface device, more messages configured to educate the driver about autonomous-driving operations of the vehicle.

The interaction module can be configured to at the lowest interaction mode corresponding to the highest level of interaction, generate at least one of (a) a pre-action request for approval for a proposed autonomous-driving action for the vehicle and (b) a post-action message comprising driver feedback information regarding an autonomous-driving action performed at the vehicle.

In various embodiments, (A) the interaction module is configured to, at the lowest interaction mode corresponding to the highest level of interaction, generate a pre-action request for approval for a proposed autonomous-driving action for the vehicle, and (B) the system further comprises a vehicle-maneuver module configured to initiate the proposed autonomous-driving action for the vehicle in response to receiving, by way of the processing hardware unit and the tangible interface device, a driver-approval communication.

The interaction module can be configured to, at the lowest interaction mode corresponding to the highest level of interaction, (I) receive, by way of the processing hardware unit and the tangible interface device, a driver communication, and (II) determine a responsive operation to perform in response to the driver communication.

In various embodiments, the driver communication includes at least one expression selected from a group consisting of a gesture, tactile or touch input, such as to a touch-sensitive screen, knob, or lever, a voice statement, a voice request for vehicle feedback, and another voice expression.

The responsive operation can include at least one operation selected from a group consisting of (i) determining an autonomous-driving action based on the driver communication, (ii) providing a system recommendation, based on the driver communication, to perform an autonomous-driving action, (iii) initiating an autonomous-driving action based on the driver communication, (iv) initiating early performance of an autonomous-driving action to alleviate a driver concern indicated by the driver communication, and (v) initiating a transfer of vehicle control, to the system from the driver or to the driver from the system, in response to the driver communication.

In various embodiments, the responsive operation comprises at least one operation selected from a group consisting of (a) determining the applicable interaction mode based on the driver communication, (b) changing the applicable interaction mode based on the driver communication, and (c) proposing an alternative interaction mode based on the driver communication.

The responsive operation can include at least one operation selected from a group consisting of (I) determining a responsive message, of said system messages, based on the driver communication, the responsive message comprising information requested by the driver communication, and (II) determining, based on the driver communication, a responsive message, of said system messages, configured to alleviate a driver concern indicated by the driver communication.

The responsive operation in some cases includes establishing, based on the driver communication, a driver preference to affect autonomous-driving actions of the vehicle.

The interaction module can be configured to generate at least one tutoring system message to include content configured to educate the driver about a corresponding autonomous-driving action of the vehicle and thereby engender driver confidence in autonomous-driving operation of the vehicle.

The interaction module is in some implementations configured to transmit the system messages, configured to transmit the tutoring system message (A) in advance of the corresponding autonomous-driving action or (B) following the corresponding autonomous-driving action, in some implementations.

In various embodiments, the interaction module, in being configured to generate the tutoring system message, is configured to generate the tutoring system (i) to include information advising that conditions are appropriate for transferring control from manual to the vehicle, (ii) based on a driver preference established, or (iii) based on a driver driving style determined. An example driving style could be more relaxed, more aggressive, or somewhere on a continuum between the two. Other example factors affecting a determination about human-driver driving style include: (a) how often the human driver takes control, (b) under what circumstances does the human driver take control (e.g., when maneuvering tight curves, or when on or near the peak of large hills), (c) how often the driver transfers control, in what contexts, (d) under what circumstances does the human driver transfer control, (e) the interaction mode that the driver selects ("on demand" selecting) and how often and/or when the human driver changes the selection, and (f) a gap or following distance selected for adaptive cruise control.

In another aspect, the present disclosure relates to a non-transitory computer-readable storage device, for use at an autonomous-driving-capable vehicle, comprising any of the modules described above in this Summary. The modules are configured to, by way of a processing hardware unit executing instructions of the modules, perform the corresponding functions described herein.

In various embodiments, the disclosure provides a method, for an autonomous-driving-capable vehicle, comprising any of the functions described, and performed by, a processing hardware unit executing instructions of the modules.

Other aspects of the present technology will be in part apparent and in part pointed out hereinafter.

Figure 1:
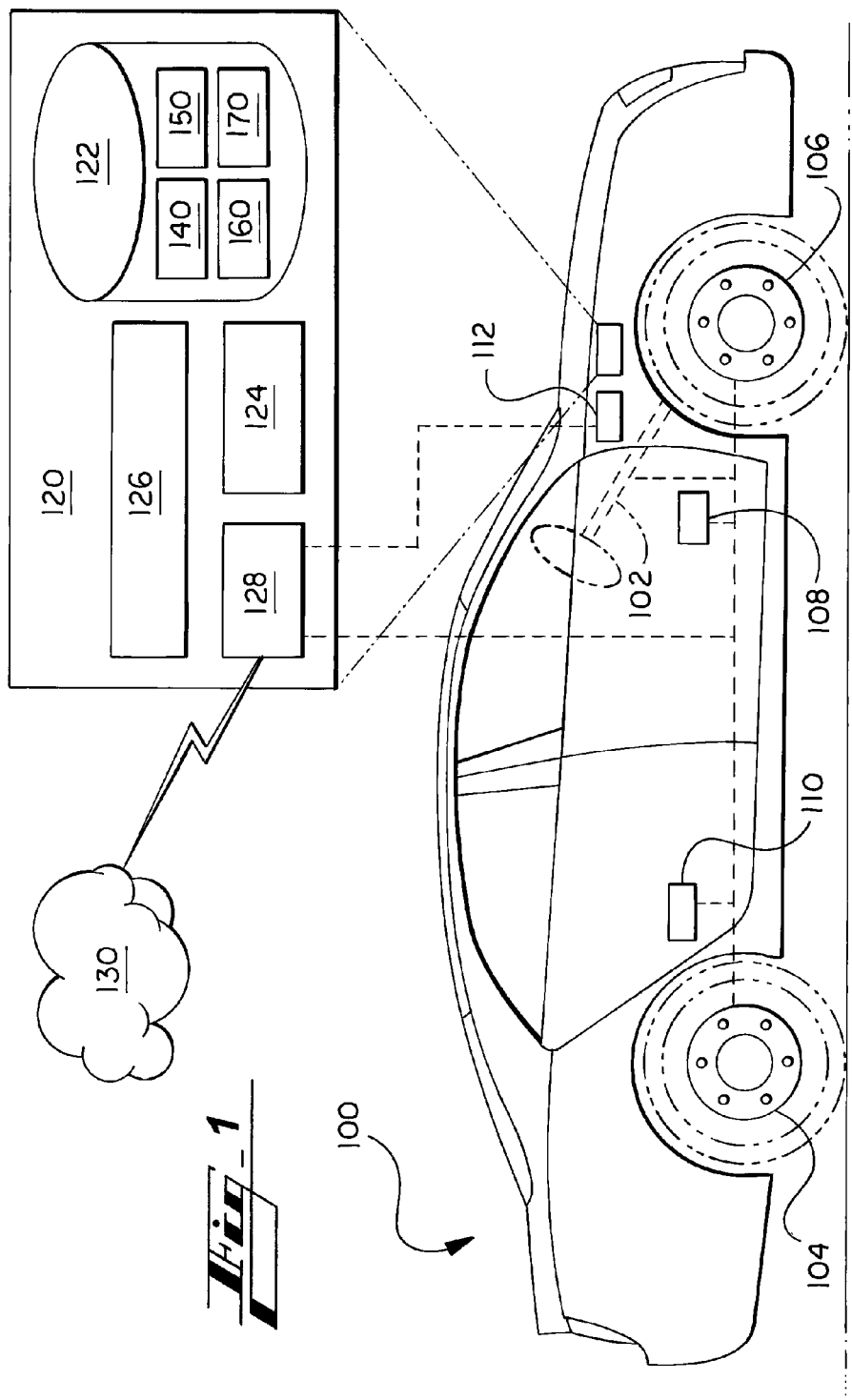
FIG. 1 illustrates schematically an autonomous-driving-capable vehicle comprising an interface system according to an embodiment of the present disclosure.

The figures are not necessarily to scale and some features may be exaggerated or minimized, such as to show details of particular components.

In some instances, well-known components, systems, materials or methods have not been described in detail in order to avoid obscuring the present disclosure.

Specific structural and functional details disclosed are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

Specific structural and functional details disclosed herein are not to be interpreted as limiting, but merely as a basis for the claims and as a representative basis for teaching one skilled in the art to employ the present disclosure.

While the present technology is described primarily herein in connection with automobiles, the technology is not limited to automobiles. The concepts can be used in a wide variety of applications, such as in connection with aircraft and marine craft.

I. Systems Overview

The present disclosure describes a vehicle-user-interaction system. The vehicle-user-interaction system is configured and arranged in an autonomous-driving-capable vehicle to deliver and receive communications to and from the user. The interactions are performed in accord with a select level of interaction corresponding to the user.

In some implementations, a degree of the interactions for the user is determined by the system based on an express user communication of the interaction level desired. In some implementations, the system determines an applicable level of interaction based on factors such as any pre-established user setting or preference, user communications, or other behavior of the user.

Generally, the system is configured to interact more with users who have requested or would apparently benefit most from higher levels of interaction. The interaction in various embodiments includes information advising the user of planned autonomous driving functions, requests for approval to perform such functions, and information describing how or reasons why an immediately preceding autonomous-driving function was performed. The system is configured to provide experienced users, who are more comfortable using autonomous-driving functions, with little to no interaction beyond the information that the autonomous-driving system may otherwise provide.

As an example, for a novice user, the vehicle-user-interaction system may in addition to default illumination of a dashboard light or screen display indicating that the vehicle is passing another vehicle, the vehicle-user-interaction system may provide the novice user with other advance notice, such as by way of a gentle voice through vehicle speakers, indicating that the vehicle is preparing to safely pass a slow-moving vehicle ahead. For an expert user, on the other hand, the vehicle-user-interaction system may not add any communications, to supplement the default dashboard light mentioned, in connection with passing the slower vehicle.

While two primary user statuses, novice and expert modes are described in the preceding paragraphs, the vehicle-user-interaction system is configured in various embodiments to include any number of various interaction modes corresponding with respective levels of interaction. In one implementation, there is a fully-manual interaction mode and four autonomous-driving interaction modes, including a fully-automated interaction mode.

In one embodiment, the vehicle-user-interaction system is configured to allow the user to set the interaction level by way of a human-machine interface (HMI) such as a knob, dial, or touch-sensitive screen. In various embodiments, the vehicle-user-interaction system is configured to determine a recommended system interaction level for the user based on user communications, settings, preferences, or behavior, such as driving behavior or responses to autonomous-driving actions.

II. System Components—FIG. 1

Now turning to the figures, and more particularly to the first figure, FIG. 1 illustrates a schematic diagram of an autonomous-driving-capable vehicle 100, in accordance with embodiments of the present disclosure.

The vehicle 100 comprises numerous components including a steering assembly 102, one or more braking assemblies 104, 106, and an acceleration assembly 108. Other vehicle-control components that can be used with the present technology are indicated generically at reference numeral 110. In various embodiments, the vehicle control components are computer controllable to affect driving of the vehicle.

The vehicle 100 also includes one or more vehicle-user interfaces 112. The vehicle-user interface(s) 112 include hardware by which a user, such as a driver of the vehicle, can provide input to and/or receive output from a computerized controller of the vehicle. The interface(s) 112, like all components described herein, can be referred to by a variety of terms. The interface(s) 112 can be referred to, for instance, as a vehicle-driver interface (VDI), a human-machine interface (HMI), a vehicle input, a vehicle I/O, or the like.

FIG. 1 shows schematically such a computerized controller, or control system 120, for use in accordance with embodiments of the present disclosure. It is contemplated that the control system 120 can be implemented in one or more of a variety of forms, such as with an onboard computer, in the form of a server, within a mobile communications device, or other.

Although connections are not shown between all of the components illustrated in FIG. 1, the components can interact with each other to carry out system functions.

As shown, the control system 120 includes a memory, or computer-readable storage device 122, such as volatile medium, non-volatile medium, removable medium, and non-removable medium. The term computer-readable media and variants thereof, as used in the specification and claims, refer to tangible or non-transitory, computer-readable storage devices.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The control system 120 also includes a processing hardware unit 124 connected or connectable to the computer-readable storage device 122 by way of a communication link 126, such as a computer bus.

The processing hardware unit 124 can include or be multiple processors, which could include distributed processors or parallel processors in a single machine or multiple machines. The processing hardware unit can be used in supporting a virtual processing environment. The processing hardware unit could include a state machine, application specific integrated circuit (ASIC), programmable gate array (PGA) including a Field PGA, or state machine. References herein to the processing hardware unit executing code or instructions to perform operations, acts, tasks, functions, steps, or the like, could include the processing hardware unit performing the operations directly and/or facilitating, directing, or cooperating with another device or component to perform the operations.

The computer-readable storage device 122 includes computer-executable instructions, or code. The computer-executable instructions are executable by the processing hardware unit 124 to cause the processing hardware unit, and thus the control system 120, to perform any combination of the functions described in the present disclosure.

The storage device 122 is in various embodiments divided into multiple modules 140, 150, 160, 170, each comprising or being associated with code causing the processing hardware unit 124 to perform functions described herein.

The control-system modules 140, 150, 160, 170 in various embodiments include an interaction-mode-determining module 140, an interaction module 150, a vehicle-maneuver module 160, and one or more other modules 170.

As described more below, the interaction-mode-determining module 140 is configured with computer-executable code designed to cause the processing hardware unit 124 to perform functions related to determining an applicable interaction mode for a particular user.

The interaction module 150 is configured with computer-executable code designed to cause the processing hardware unit 124 to perform functions related to interacting with the user. The functions can include determining what messages to provide to the user and determining what user behaviors (e.g., gestures, driving style) or user communications (e.g., statements or inquiries) advise about the user and user needs.

The messages can include, for instance, (i) responses to user inquiry, (ii) advance notice of a planned autonomous driving maneuver or action, or (iii) a reason, description, or other information related to an autonomous maneuver or action just performed.

The vehicle-maneuver module 160 is configured with computer-executable code to cause the processing hardware unit to initiate performance of an autonomous-driving maneuver or action for the vehicle. The vehicle-maneuver module 160 can be configured to initiate the action in response to any of a variety of triggers, such as in response to user request, user proposal, or determining that the maneuver or action should be taken, for instance.

The fourth illustrated module 170 can represent one or more additional modules. Example functions that code of the additional module(s) 170 can cause the processing hardware unit 124 to perform include building or updating a user profile. The user profile can include, for instance, user settings. The settings can include preferences that the user has input or expressed, or that the system 120 has determined based on user behavior (e.g., driving style, gestures, etc.) or based on user communications (e.g., statements, inquiries, etc.).

Modules 140, 150, 160, 170 can be referred to by a wide variety of terms including by functions they are configured to perform. In the latter example, for instance, the module 170 can be referred to as a user-profile module, a profile-builder module, or the like.

While four modules 140, 150, 160, 170 are illustrated in FIG. 1 by way of example, the non-transitory computer-readable storage device 122 can include more or less modules. Any functions described herein in connection with separate modules can instead, in another embodiment, be performed by the processing hardware unit 124 executing code arranged in a single module. And any functions described herein in connection with a single module can be performed instead by the processing hardware unit 124 executing code of more than one module.

The control system 120 further comprises an input/output (I/O) device 128, such as a wireless transceiver and/or a wired communication port. The device 128 can include, be a part of, or be a tangible communication device. The processing hardware unit 124, by way of the I/O device 128, and executing the instructions, including those of the mentioned modules 140, 150, 160, 170, sends and receives information, such as in the form of messages or packetized data, to and from one or more vehicle components, including the vehicle control components 102, 104, 106, 108, 110 mentioned.

In some implementations, the I/O device 128 and processing hardware unit 124 are configured such that the unit 124, executing the instructions, sends and receives information to and from one or more networks 130 for communication with remote systems. Example networks 130 can include the Internet, local-area networks, or other computing networks, and corresponding network access devices include cellular towers, satellites, and road-side short- or medium-range beacons such as those facilitating vehicle-to-infrastructure (V2I).

In some embodiments, such as when the system 120 is implemented within a vehicle 100, the system 120 includes or is connected to one or more local input devices 112 and/or one or more output devices 104, 106, 108, 110, 112, 114.

The inputs 112 can include in-vehicle knobs or dials (FIG. 2, for instance), touch-sensitive screens (FIG. 3 for instance), microphones, cameras, laser-based sensors, other sensors, or any device suitable for monitoring or receiving communication from a user (e.g., driver) of the vehicle 100. User communication can include, for instance, gestures, button pushes, or sounds. The user communications can include audible sounds such as voice communications, utterances, or sighs from the user.

The inputs 112 can also include vehicle sensors such as positioning system components (e.g., GPS receiver), speed sensors, and camera systems.

Any of the components described herein can be considered a part of a kit, apparatus, unit, or system. For instance, the vehicle output components 102, 104, et. seq.—e.g., actuators—can be a part of a system including the controller 120. In one embodiment, the controller 120 is a sub-system of a larger system such as, but not limited to, the vehicle 100.

III. Tangible Input Components—FIGS. 2 and 3

Figure 2:
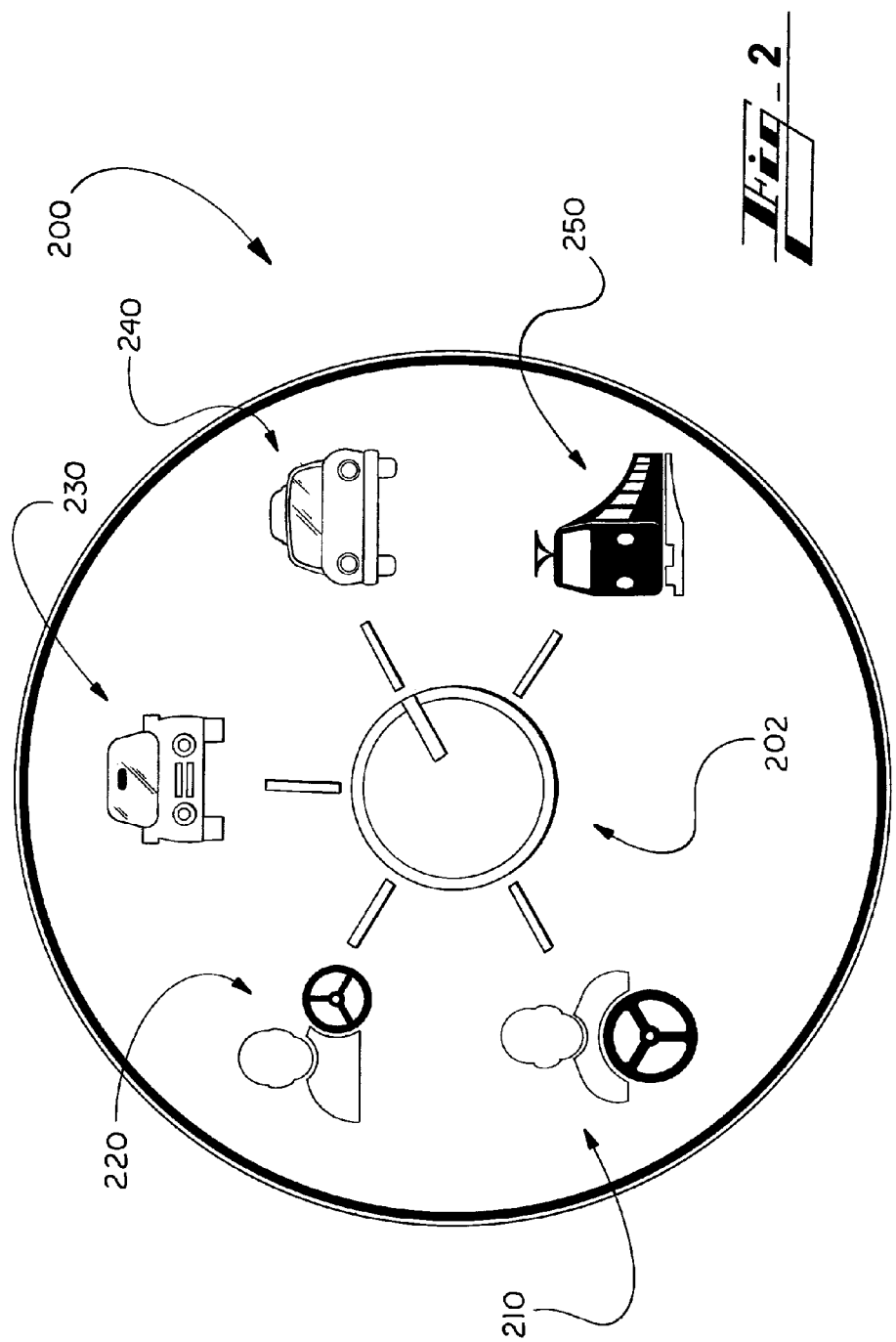
FIG. 2 illustrates a first example system-user interface device according to an embodiment of the present disclosure.
Figure 3:
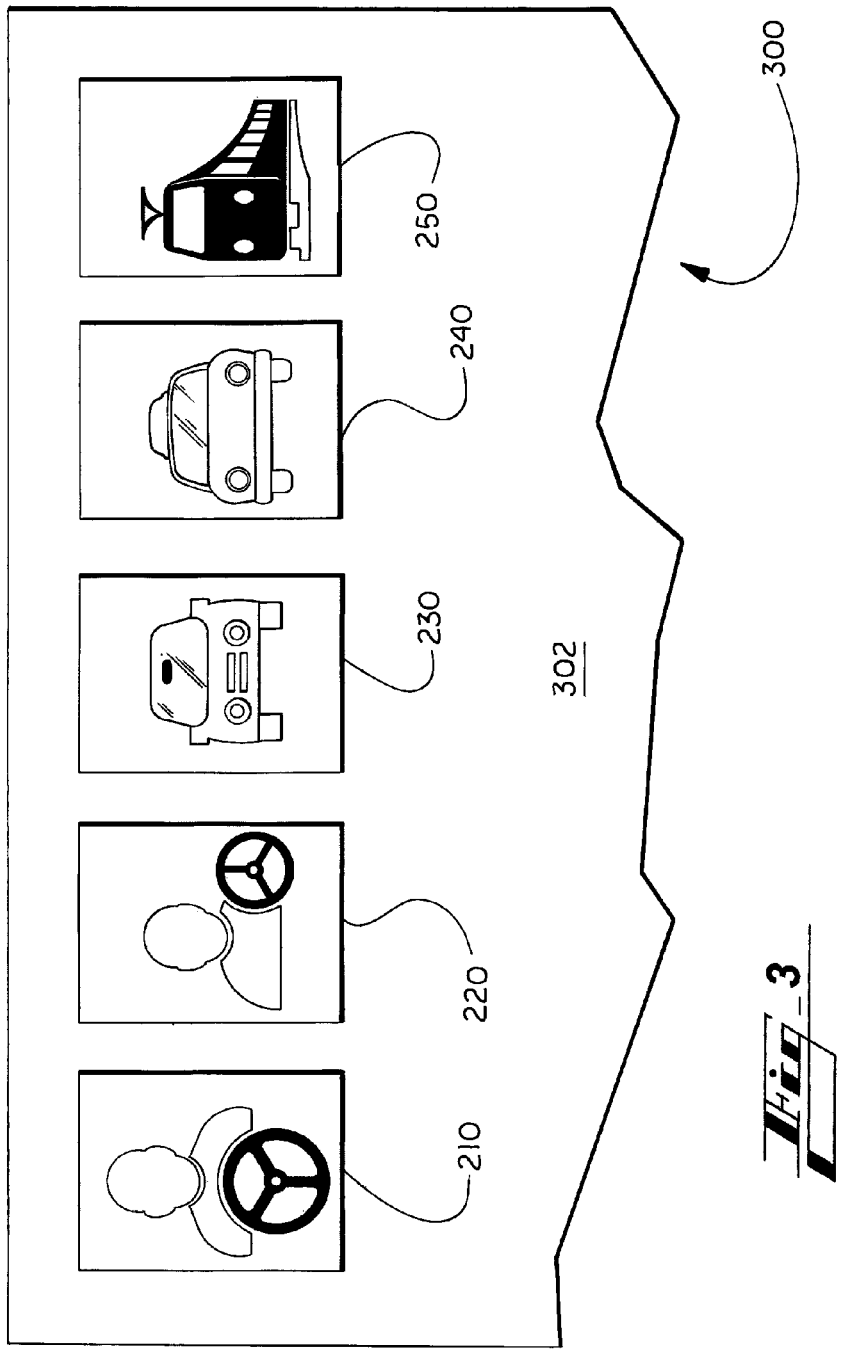
FIG. 3 illustrates a second example system-user interface device according to an embodiment of the present disclosure.

FIGS. 2 and 3 show example tangible input components 200, 300.

The input component 200 of FIG. 2 includes a knob or dial 202 by which the user can indicate which interactive mode the user would like to be associated with in connection with autonomous driving. By the dial 202, the user can select any of a plurality of optional modes.

The system function can be referred to as an "on demand" function by which the user can indicate or demand a level of autonomous-driving-related interaction that they want the system 120 to provide.

FIG. 2 shows five optional modes: a first mode 210 dedicated to fully manual vehicle operation, and five consecutive autonomous-driving interaction modes 220, 230, 240, 250. This number of modes is exemplary, and the control system 120 can be configured with less or more than four autonomous-driving interaction modes 220, 230, 240, 250.

In contemplated embodiments, one or more of the interaction features are not limited to being associated exclusively with a particular interaction mode. The system 120 can be configured to determine, for instance, that while a user has a comfort level equal to an expert passenger (corresponding to the third interaction mode 240 in the primary example provided herein) in connection with most autonomous-driving functionality, the user is not yet comfortable with a certain autonomous-driving function, such as passing on two lane roads. The system 120 can build a user profile to accommodate characteristics of the particular user. The profile may result in a hybrid interaction approach, whereby interaction activities associated generally with various interaction modes are used for the user. This can be the case even if the system 120 or user has separately selected a particularly interaction mode.

The input component 300 of FIG. 3 includes a touch-sensitive display 302 by which the user can indicate which interactive mode the user would like to be associated with in connection with the autonomous-driving-capable vehicle operations. The display 302 can include a screen or other display (a heads-up display arrangement, for example) by which the system can present options from which the user can selection.

By the display 302, the user can select any of a plurality of optional interaction modes. By way of example, FIG. 3 shows the same five modes as shown in FIG. 2: a first interaction mode like that of FIG. 2—indicated again by numeral 210 for simplicity. The first interaction mode 210 corresponds to fully manual vehicle operation. Four consecutive autonomous-driving interaction modes are indicated again by numerals 220, 230, 240, 250.

The system 120 can define more or less than five modes. In various embodiments, the system 120 includes at least three modes: a fully-manual mode, a lower or lowest autonomous-driving interaction mode and a higher or highest autonomous-driving interaction mode. The lowest autonomous-driving interaction mode is suitable for users having little or no experience, or at least having a low comfort level using autonomous-driving functions. The lowest mode of three can include the novice interaction mode 220 described, or a combination of that mode and features of the next higher mode or modes (e.g., 230, or 230 and 240) described primarily herein. The highest mode, or expert, mode can correspond to any or a combination of the top three modes 230, 240, 250 of the five described primarily herein.

In various embodiments, the system 120 is configured to, in connection with some or all of the autonomous-driving interaction modes 230, etc., affect autonomous driving functions of the vehicle 100. The system can affect more- or less-frequent transfers of control between the human driver and the autonomous driving system, for instance, or a manner by which the vehicle cruise control is adapted, or passing maneuvers are performed.

In other embodiments of the present technology, the system 120, or at least the modules described herein (modules 140, 150, etc.), is/are not configured and arranged in the vehicle 100 to affect the autonomous functions of the vehicle, no matter the interaction mode (210, 220, etc.) selected. In this case, the system 120 is configured to interact with the human driver, in accord with the applicable interaction mode (210, 220, etc.) determined, but not to affect autonomous driving functions performed by an autonomous driving system.

As provided, in one embodiment, the autonomous-driving system is configured to, for instance, operate the same whether the interaction system 120 is operating, how the interaction system 120 is operating, or even whether the interaction system 120 is present. For instance, the system 120 would in this case not affect whether, when, or how often transfers of control are made, or a manner by which passing maneuvers are executed.

III.A. Fully Manual Interaction Mode 210

The fully manual driving mode corresponds to non-autonomous operations of the vehicle 100. The mode is appropriate for drivers who do not want to use autonomous driving. They may prefer driving manual for any of a variety of reasons, such as because they lack trust with automated-driving operations, or because they simply prefer to drive manually at the time. The fully manual interaction mode can thus be used in association with driver who is not experienced and comfortable with autonomous driving.

In one embodiment, the control system 102 does not interact with the user while in fully manual interaction mode 210.

In another embodiment, the control system 102 provides occasional messages to the user. The message can include, for instance, a suggestion to the user to use autonomous driving, and can indicate the underlying conditions—e.g., "the present condition, including highway driving without much traffic, is ideal for basic autonomous driving."

In a contemplated implementation, the control system 102 determines whether the user is inexperienced or more experienced. Occasional informative or enquiring communications, such as the example notice of the immediately preceding paragraph, are provided for an inexperienced user, but would not be provided, or would be provided with less information and/or with less frequency for an experienced user.

Regarding selection of the manual-driving interaction mode 210, the processing hardware unit 124 executing code of the mode-selecting module 140 in one embodiment selects the fully manual driving mode 210 based on user express selection. For instance, the user opts for the mode, "on demand," such as by the dial 200 or screen 300 shown in FIGS. 2 and 3. The processing hardware unit 124 executing code of the mode-selecting module 140 in one embodiment selects the fully manual driving mode 210 based on other present context. The context can include user communications (statements or enquires, for instance) and/or user behavior (gestures, utterances, etc.) indicating that the user does not want to be in any autonomous-driving interaction mode, or is otherwise uncomfortable with the autonomous-driving interaction mode. The context can include, for instance, that the driver indicating to the autonomous-driving-capable vehicle that they want to drive manually, such as by taking control of the steering wheel, pressing the brake, pressing the accelerator, etc.

III.B. Novice Interaction Mode 220

The first and lowest autonomous-driving interaction mode 220 can be referred to by any of a variety of names, including novice autonomous-driving interaction mode, beginner autonomous-driving interaction mode, beginner driver autonomous-driving interaction mode, tutor autonomous-driving interaction mode, new-driver tutor autonomous-driving interaction mode low-trust autonomous-driving interaction mode, low-comfort autonomous-driving interaction mode, lowest-trust autonomous-driving interaction mode, lowest-comfort autonomous-driving interaction mode, new driver autonomous-driving interaction mode, new driver tutor, or the like.

This mode is appropriate for drivers having little or no experience with autonomous driving, or who otherwise have low levels of trust of autonomous driving. While the novice human driver lets the vehicle drive autonomously at times, the system 102 is configured to expect the novice human driver to monitoring the driving constantly or at least heavily.

As provided, at lower autonomous-driving interaction modes, more information is provided to and sought from (e.g., more monitoring of) the human driver. For instance, the system 120 is configured to provide and receive the most amount of communications to/from the human driver—that is, have the highest level of interaction—in the novice autonomous-driving interaction mode as compared to the other autonomous-driving interaction modes (e.g., 230, 240, etc.). The level of interaction increases for each mode—the interaction is lower for the third autonomous-driving interaction mode 240 than for the second autonomous-driving interaction mode 230, for instance.

In addition to the system 120 being configured to expect the novice human driver to be monitoring the autonomous driving heavily in connection with the first autonomous-driving interaction mode 220, the system 120 is configured to expect the human driver to provide communications regarding autonomous vehicle operations. The communications may or may not be expressed for processing by the vehicle 100, and can take any of a variety of forms. For those directed to the vehicle, the human driver expects the vehicle to respond or at least consider the communication in vehicle operations.

Human-driver communications can include, for instance, express orders or statements, inquiries, gestures, or utterances. An example statement or order from the human driver is, "slow down." Example inquiries include the human driver asking, "can we safely go faster?" or "did you see that pedestrian?"

An example gesture is the human driver putting their hands on their face, perhaps because the human driver is not confident that the vehicle will indeed perform a needed maneuver autonomously. In some embodiments, once the user has selected an interaction mode, such as by a dial device, the system no longer needs to monitor driver actions or communications for determining an applicable mode.

An example utterance could include the human driver exclaiming, "whoa," in a similar situation—when the human driver is not confident that the vehicle will indeed perform a needed maneuver autonomously.

An example manner for responding to any human-driver communication is for the system to provide for the driver a system statement responsive to the driver communication.

As mentioned, the system 120 can be configured to, in addition to interacting with the human driver at an appropriate level for the first autonomous-driving interaction mode 220 and any autonomous-driving interaction mode, affect autonomous driving functions of the vehicle 100. Another example manner for the system 120 to respond to human-driver communications is adjusting user settings or preferences. Such settings in some embodiments affect autonomous driving functions. As an example of adjusting user preferences, the system 120 can determine that based on human-driver feedback during driving, the human driver would be more comfortable if the system 120 maintained a larger gap between the vehicle 100 and vehicle ahead. In one embodiment, the system can be configured to, given an applicable interaction mode, establish a maximum gap level, in terms of distance or time to stop (e.g., three seconds), for instance, and not change unless the driver requests or permits the change explicitly.

As an example of responding to the driver, the system 120 may state, for instance, "yes, I saw that pedestrian standing near the curb."

The system 120 may also be configured to proactively advise the human driver, such as letting the driver know that the pedestrian was noticed, to engender trust and confidence in the human driver for the autonomous functions, even in situations in which the human driver does not express an enquiry or unease.

Further regarding affecting autonomous driving functions of the vehicle 100, the system 120 can be configured to affect more- or less-frequent transfers of control between the human driver and the autonomous-driving system. The human driver may also override automated control, and novice drivers are more likely to do so. The system 120 is programmed to expect these situations, such as by being configured to generate a communication, or select a predetermined communication, that is appropriate to the context. The communication can include, for instance, "that's fine that you took control to avoid the road hazard—just so you know, the automated driving system noticed the hazard and was preparing to make the same maneuver."

Regarding transfer of driving control (TOC) from the vehicle back to the driver, the system 120 is in various embodiments configured so that, when in the novice interaction mode 220, due to the relatively low levels of confidence or experience, the system 120 generally does not override manual control. In some embodiments, the system 120 is configured to initiate TOC to the vehicle 100 if: (1) the system 120 has prepared the human user for the potential transfer, such as by a gentle message proposing the transfer and receiving human-driver approval for the transfer, or (2) the system 120 determines that some automated control is needed to ensure safety—e.g., if the human driver is apparently having trouble keeping their lane.

III.C. Expert Companion Interaction Mode 230

The second autonomous-driving interaction mode 230 can be referred to by any of a variety of names, including expert companion autonomous-driving interaction mode, medium-trust autonomous-driving interaction mode, medium-comfort autonomous-driving interaction mode, expert new-driver companion autonomous-driving interaction mode, low-trust autonomous-driving interaction mode or low-comfort autonomous-driving interaction mode (if the prior mode is referred to as the lowest-trust or lowest-comfort autonomous-driving interaction mode), or the like.

The human driver, or companion, best associated with this mode 230 would tend to trust the automated driving functions more than the novice driver associated with the prior mode. The driver at this level has more trust and comfort with autonomous driving and will likely at times look away from the driving, such as to read, look at a passenger during conversation, or even close their eyes in rest.

The system 120 is configured, accordingly, with data and algorithms informing the system that, when in the expert companion autonomous-driving interaction mode, the human driver is more comfortable than a novice user, and requires less information about autonomous driving functions. The programing in some implementations also causes the system 120 to monitor the human driver less, such as by monitoring driver communications less.

In a contemplated embodiment, the system 120 can monitor specifically driver communications that are presented in a certain way that indicates that the communications are meant for the vehicle to comprehend, such as by being presented in a certain tone, volume, or direction of voice expression.

Regarding the possibility that the human driver will often not be paying attention, the system 120 is configured to determine or predict risk situations for which the human driver should be alerted.

As mentioned, the system 120 in some embodiments is able to affect autonomous driving functions of the vehicle 100. For embodiments in which the system 120 can affect more- or less-frequent transfers of control between the human driver and the autonomous driving system, automated transfers from the human driver to the vehicle can be more frequent in the second, expert companion autonomous-driving interaction mode 230 as compared to the first, novice autonomous-driving interaction mode 220. Because the human driver associated with the second, expert companion autonomous-driving interaction mode 230 is deemed to be more comfortable with automated functions than the novice, the system 120 is configured to more-frequently initiate a TOC to the vehicle 100. The system 120 may initiate TOC to the vehicle automatically in situations such as when the vehicle reaches a low-traffic highway driving condition. The system 120 can still in the second autonomous-driving interaction mode 230 advise the driver or request approval for the TOC in advance.

As for all autonomous-driving interaction modes, if the system 120 determines that the human driver is not comfortable with automated functions and a present level of interaction (e.g., the level of the expert companion interaction mode), the system 120 can propose to the human driver that the system 120 operate at a lower autonomous-driving interaction mode. In a contemplated embodiment, the system 120 is configured to automatically change autonomous-driving interaction modes as deemed appropriate based on any helpful factor, such as user preferences/settings, user behavior (e.g., driving style, gestures, etc.), and/or user communications (e.g., statements, inquiries, etc.).

As also for each autonomous-driving interaction mode, if the human driver would like more information and/or more manual control—e.g., more frequent TOC to the human driver or less frequent TOC to the vehicle—the human driver may elect to be associated with a lower autonomous-driving interaction mode. Likewise, if the human driver would like less information, less manual control—e.g., less frequent TOC to the human driver—the human driver may elect to be associated with a higher autonomous-driving interaction mode. The increase in user trust may stem from the interaction with the system 120.

III.D. Expert Passenger Interaction Mode 240

The third, or second highest, autonomous-driving interaction mode 240 can be referred to by any of a variety of names, including expert passenger autonomous-driving interaction mode, expert new driver passenger autonomous-driving interaction mode, taxi passenger autonomous-driving interaction mode, high-trust autonomous-driving interaction mode, high-comfort autonomous-driving interaction mode, or the like.

Human drivers, or expert passengers, best associated with this autonomous-driving interaction mode generally feel more like a passenger being transported by the car.

The system 120 is configured with data and algorithms informing the system that, when in the expert passenger autonomous-driving interaction mode, the human driver is more comfortable than lower-mode users, and requires still less information about autonomous driving functions. The system 120 is programmed to determine that the expert passenger user may intervene occasionally, but generally views the situation that the user is in a taxi cab. The user may ask questions occasionally, or request TOC to manual driving, but not often.

The system 120 is also programmed to, in this autonomous-driving interaction mode 240, transfer control automatically to the driver less as compared to the lower mode 230, realizing that the driver trusts the vehicle 100 to make needed maneuvers autonomously. The system 120 may transfer control to the driver in critical or safety-sensitive situations for instance.

III.E. Fully Passenger Interaction Mode 250

The fourth, highest, autonomous-driving interaction mode 250 can be referred to by any of a variety of names, including fully expert autonomous-driving interaction mode, fully expert passenger autonomous-driving interaction mode, fully expert driver autonomous-driving interaction mode, fully passenger autonomous-driving interaction mode, train passenger autonomous-driving interaction mode, highest-trust autonomous-driving interaction mode, highest-comfort autonomous-driving interaction mode, maximum trust or comfort autonomous-driving interaction mode, or the like.

Human drivers best associated with this autonomous-driving interaction mode feel completely comfortable with autonomous driving, and can be referred to as expert passengers.

The experience can also be analogized to train operations, with these drivers as train passengers. The human driver, who is mostly or completely a rider, or passenger, does not expect to affect or understand the transportation functions when in this autonomous-driving interaction mode 250. This is different than the user in the prior interaction mode 240, analogized to a taxi ride, wherein a user could expect to interact and affect driving of the taxi at least on a low level.

The system 120 is configured with data and algorithms informing the system that, when in the fully autonomous driving interaction mode, the human driver is completely comfortable with autonomous driving, and requires generally very little or no information about autonomous driving functions being performed.

As mentioned, the system 120 is in some implementations configured and arranged in the vehicle 100 to affect autonomous driving functions, such as gap spacing and transfer of control (TOC).

The system 120 is in various embodiments programmed to, when in this highest autonomous-driving interaction mode 250, avoid, or never affect, transfer control automatically to the driver. The vehicle 100 could be configured to, in a critical situation, for instance, transition immediately to a place of safety, such as by pulling the vehicle over to park.

The system 120 can be programmed to, for instance, assume that the human driver is completely unavailable when the fully autonomous interaction mode 250 is activated. This assumption would be the case in any event (i.e., whichever interaction mode is selected) should the human driver be determined to be unconscious or impaired so that they cannot drive safely.

IV. Methods of Operations—FIG. 4

Figure 4:
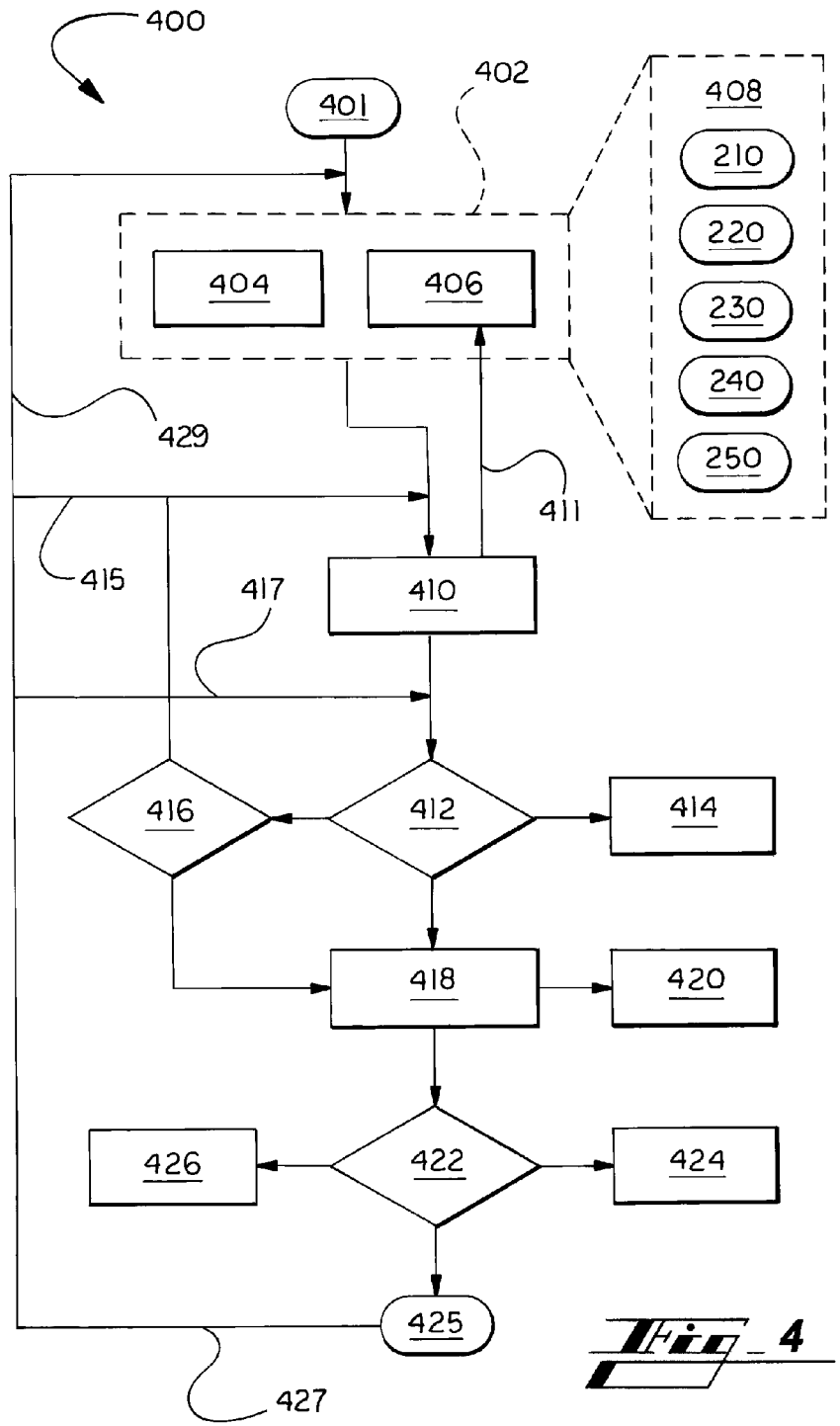
FIG. 4 illustrates methods of using the vehicle and system of FIG. 1 according to an embodiment of the present disclosure.

FIG. 4 shows an algorithm by which the present technology is implemented, outlined by flow chart as a method 400, for use at the autonomous-driving-capable vehicle 100, according to various embodiments of the present disclosure.

It should be understood that operations of the method 400 are not necessarily presented in any particular order and that performance of some or all the operations in an alternative order is possible and is contemplated. The operations have been presented in the demonstrated order for ease of description and illustration. Operations can be added, omitted and/or performed simultaneously without departing from the scope of the appended claims. It should also be understood that the illustrated method 400 can be ended at any time.

In certain embodiments, some or all operations of this process, and/or substantially equivalent operations are performed by execution by the processing hardware unit 124 of computer-readable instructions stored or included on a non-transitory computer-readable storage device, such as the storage device 122 shown in FIG. 1. The instructions can be arranged in modules, such as the modules 140, 150, 160, 170 described.

The method 400 begins 401 and flow proceeds to block 402, whereat the processing hardware unit 124, executing code of the mode-determining module 140 determines an applicable interaction mode corresponding to a user (e.g., vehicle driver) of the autonomous-driving-capable vehicle. In some embodiments, the mode-determining module 140, in being configured to determine the applicable interaction mode corresponding to the driver of the autonomous-driving-capable vehicle, is configured to select the applicable interaction mode from a plurality of pre-established interaction modes. Example interaction modes are indicated generally by reference numeral 408 in FIG. 4, and include the same example interaction modes indicated above —for example: the manual-driving interaction mode 210 and four autonomous-driving interaction modes 220, 230, 240, 250.

The mode-determining module 140 can be configured to cause the processing hardware unit 124 to make the selection based on express user input received at a tangible input component and indicating an interaction mode desired. Selection based on such user input, indicating the mode expressly, is indicated by block 404. Example inputs, or vehicle-user interfaces, include a microphone, a knob or a dial, such as the device 200 of FIG. 2, and a touch-sensitive display, such as the arrangement 300 of FIG. 3.

In various embodiments, mode-determining module 140 can be configured to cause the processing hardware unit 124 to determine a recommended system interaction level for the user based on user communications, settings, preferences, or behavior, such as driving behavior or responses to autonomous driving operations such as transfers of control from the driver to the vehicle or vice versa. The system 120 recommending and selecting, or just determining, an applicable mode is indicated by block 406.

At block 410, the interaction module 150 causes the processing hardware unit 124 to receive and process information regarding the user. The information can include a user communication (statement, inquiry, gesture, utterance, for example) or a user preference communicated expressly or determined from context including user communications, for instance.

As described above, in some embodiments the system 120 is configured to monitor the human driver. The monitoring can be performed in connection with block 410, for example. The monitoring can be performed more when the interaction mode is higher (e.g., novice mode 220) than when the interaction mode is lower (e.g., expert passenger mode 230, et seq.). Monitoring more can include monitoring more frequently, for instance, and/or to a higher degree—e.g., configured to in addition to picking up communications made by way of a microphone or a touch-sensitive screen, pick up more communications, such as by a camera or laser-based sensor system detecting user gestures.

The system 120 is in some embodiments configured to recommend, or simply determine and change, an applicable interaction mode based on user behavior, settings, and/or the like. This can occur at various stages of the method 400, and is shown by way of example by reference numeral 411 in FIG. 4.

At block 410, the interaction module 150 could also cause the processing hardware unit 124 to determine a responsive operation to perform in response to the driver communication. The block 410 can include initiating the performance or actually performing the operation determined.

Example responsive operations include (i) determining an autonomous-driving action based on the driver communication, (ii) providing a system recommendation, based on the driver communication, to perform an autonomous-driving action, (iii) initiating an autonomous-driving action based on the driver communication, (iv) initiating early performance of an autonomous-driving action to alleviate a driver concern indicated by the driver communication, (v) initiating a transfer of vehicle control, to the system from the driver or to the driver from the system, in response to the driver communication, (vi) determining the applicable interaction mode based on the driver communication, (vii) changing the applicable interaction mode based on the driver communication, (viii) proposing an alternative interaction mode based on the driver communication, (ix) determining a responsive message, based on the driver communication, comprising information requested by the driver communication, (x) determining, based on the driver communication, a responsive message configured to alleviate a driver concern indicated by the driver communication, and (xi) establishing, based on the driver communication, a driver preference to affect autonomous-driving actions of the vehicle.

Continuing with the algorithm 400, the interaction module 150 is configured to, at diamond 412, cause the processing hardware unit 124 to determine whether a pre-autonomous action message should be provided to the human driver.

In response to an affirmative determination at diamond 412 (i.e., that a message should be provide), flow proceeds to at least block 414 whereat the processing hardware unit 124, executing code of the storage device 122, initiates communication of the message to the human driver.

The communication of block 414 is provided based on the applicable interaction mode determined at 402 and related to one or more autonomous-driving activities or functions of the vehicle 100. In situations in which a communication is provided to the human user by the system 102 without the human user prompting for the communication, the communication, and system function, can be referred to as proactive. The system and functions in this case, and all instances regarding system functions can be referred to also as intelligent because they are related to providing system-user interactions at a level customized to the user situation.

The communication can include more information when the interaction mode is higher (e.g., novice mode 220) than when the interaction mode is lower (e.g., expert passenger mode 230, et seq.). Additional information can include information configured to educate the human driver about autonomous functions, to engender trust and comfort in the human driver with the autonomous driving capabilities. These type of communications, or the function of providing them, can be referred to by a variety of terms, such as tutoring, educating, training, informing, or the like.

In addition to increasing human-driver trust and comfort with the autonomous-driving functions of the vehicle 100, interactions—e.g., messaging—can be configured to inform the user particularly of autonomous driving functions that the user may not be aware of. Some of these functions can be referred to as advanced, or more-advanced functions. A user may be well aware of more basic functions, such as the vehicle being capable of adaptive cruise control and lane-keeping in highway conditions, for instance, but not that the vehicle can parallel park itself, or is capable of quickly identifying and avoiding an expected road hazard.

Advanced features are also in these ways made more accessible for less-experienced drivers. A human driver unexperienced with the autonomous-driving-capable vehicle 100 will be more likely to use an advanced autonomous driving features, or any autonomous-driving feature, if the vehicle 100 is interacting with them before, during, and/or after an autonomous maneuvers, and especially with respect to those maneuvers that the human driver may otherwise feel uncomfortable with the vehicle handling autonomously.

The communication can be made by any suitable communication interface. The interface includes hardware by which a user, such as a driver of the vehicle, can provide input and/or receive output from a computerized controller of the vehicle. This vehicle-driver interface (VDI) is indicated schematically by reference numeral 112. The VDI 112 can be referred to by a variety of terms. The VDI can also be referred to as a human-machine interface (HMI), a vehicle input, a vehicle I/O, etc. Example interfaces include a display-screen component, a heads-up display unit, and an audio-speaker component.

If, in addition to an affirmative determination at diamond 412 (i.e., that a message should be provide), the system 120 determines that the message should be a human-driver inquiry, flow proceeds also to 416 whereat the processing hardware unit 124 monitors for or at least receives a human-driver response.

The human-driver response received at diamond 416 can include, for instance, an approval of an autonomous driving maneuver proposed to the human driver at block 414. In some implementations, such approval is required before the system 120 initiates the maneuver proposed. In such case, if the human-driver response received at diamond 416 does not include an approval, flow of the algorithm 400 can proceed along path 415 or path 417.

For cases in which (i) human-driver approval is received, (ii) the approval is not required in connection with the monitoring of diamond 416, or (iii) a negative determination is reached at diamond 412 (i.e., that a message should not be provide), flow proceeds to block 418.

Information collected or generated at diamond 416 can be used in a variety of ways. These ways include those reference above—for instance, to create or adjust user settings or preferences, or to determine or recommend a different interaction mode 210, 220, 230, 240, 250 (analogous to flow path 411) based on the information.

At block 418, the vehicle-maneuver module 160 causes the processing hardware unit 124 to determine an autonomous driving maneuver or action to take. The module 160 can be configured to cause the processing hardware unit 124 to determine the maneuver based on the applicable interaction mode determined at 402. The maneuver can be less aggressive, such as by being performed at a lower vehicle speed, for instance, when the interaction mode is higher (e.g., novice mode 220) as compared to when the interaction mode is lower (e.g., expert passenger mode 230, et seq.).

At block 420, the vehicle-maneuver module 160 causes the processing hardware unit 124 to initiate the maneuver determined.

At diamond 422, the vehicle-maneuver module 160 or the interaction module 150 causes the processing hardware unit 124 to determine whether a post-autonomous-maneuver message should be provided to the human driver.

While pre-autonomous-maneuver communications (412/414) and post-autonomous-maneuver communications 422/424) are described primarily, it should be appreciated that intra-autonomous-maneuver, or during-maneuver, communications can also be provided to the human driver for stated purposes, such as to calm or educate the human driver.

In response to an affirmative determination at diamond 422 (i.e., that a message should be provide), flow proceeds to at least block 424 whereat the processing hardware unit 124 initiates communication of the message to the human driver.

The communication of block 424 is provided based on the applicable interaction mode determined at 402 and related to the autonomous-driving activity performed by the vehicle 100. As with the communication of block 414, the communication of block 424 can include more information when the interaction mode is higher (e.g., novice interaction mode 220) than when the interaction mode is lower (e.g., expert passenger interaction mode 230, et seq.). Again, the information can include tutoring- or education-based information, as mentioned in connection with the communication of clock 424, to promote human-driver trust and comfort with autonomous driving functions.

The communication can be made by any suitable communication interface, including by one or more of the exemplary devices 112 described above.

In some embodiments, the interaction module 150 is configured to cause the processor to at block 426 monitor the human user for, or at least receive from the human user, feedback responsive to the message communicated via block 424. The message of block 424 could be an inquiry for instance—"was that a comfortable passing maneuver?", for example—and the feedback at block 426 can include a response.

As with all information collected or generated based on communications or behavior of the human driver, information from block 426 can be used in a variety of ways. These ways include those referenced above—for instance, to create or adjust user settings or preferences, or to determine or recommend a different interaction mode 210, 220, 230, 240, 250 (analogous to flow path 411) based on the information.

The method 400 can end 425, or any one or more operations of the method 400 can be performed again, as indicated in FIG. 4 by path 427 which can flow, by way of example, to paths 415, 417, or 429.

V. Select Benefits of the Present Technology

Many of the benefits and advantages of the present technology are described above. The present section restates some of those and references some others. The benefits are provided by way of example, and are not exhaustive of the benefits of the present technology.

In various embodiments, the present technology allows a human driver to select, "on demand," a level of interaction desired in connection with autonomous-driving activities of the vehicle. This flexibility has many advantages. For instance, it accommodates the reality that various drivers have various levels of trust and comfort with autonomous driving. By the present technologies, each human driver can interact with the autonomous-driving-capable vehicle in a manner that is most comfortable for them at the time.

The system is further configured to, in interacting more with human drivers having less experience with autonomous driving, inform and educate to engender trust. Results can include (i) increasing the comfort level of the user in using the autonomous-driving-capable vehicle, (ii) increased use of basic autonomous-driving functions, and (iii) awareness and increased use of more-advanced autonomous-driving capabilities by the human driver. Increased awareness in advanced autonomous-driving capabilities is promoted by, for example, the educational or tutoring functions of the present technology.

Advanced autonomous-driving features are made more accessible for less-experienced drivers by the present interaction-system technology. A human driver inexperienced with autonomous driving will be more likely to use an advanced autonomous-driving features, or any autonomous-driving feature, if the vehicle is interacting with them before, during, and/or after all or select autonomous maneuvers, and especially with in connection with maneuvers that the human driver may otherwise feel uncomfortable with the vehicle handling autonomously.

Increased adoption of autonomous-driving functions can also affect marketing and sales of autonomous-driving-capable vehicles. As users trust autonomous-driving-capable vehicles more, and also if they begin to appreciate advanced autonomous-driving capabilities more, they are more likely to purchase an autonomous-driving-capable vehicle and model use of, or recommend, one to others.

VI. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system, for use at an autonomous-driving-capable vehicle, comprising:
   a processing hardware unit;
   a tangible interface device;
   a mode-determining module configured to, via the processing hardware unit, select, from amongst a plurality of pre-established interaction modes, an applicable interaction mode corresponding to a driver of the autonomous-driving-capable vehicle, wherein the plurality of pre-established interaction modes comprise a minimum autonomous-driving interaction mode, an intermediate autonomous-driving interaction mode, and a maximum autonomous-driving mode; and
   an interaction module configured to, via the processing hardware unit:
      interact, by way of the tangible interface device, with the driver at a highest level of interaction if the minimum autonomous-driving interaction mode is selected;
      interact, by way of the tangible interface device, with the driver at an intermediate level of interaction, lower than said highest level of interaction, if the intermediate autonomous-driving interaction mode is selected; and
      interact, by way of the tangible interface device, with the driver at a lowest level of interaction, lower than said intermediate level of interaction, if the maximum autonomous-driving interaction mode is selected.

2. The system of claim 1, wherein the tangible interface device comprises at least one component selected from a group consisting of a microphone, a visual sensor, a motion detector, a display-screen component, a display unit, and an audio-speaker component.

3. The system of claim 1, wherein the mode-determining module, in being configured to select the applicable interaction mode from amongst the plurality of pre-established modes, is configured to select the applicable interaction mode based on a user input received at a tangible input component selected from a group consisting of a knob, a dial, a touch-sensitive display, and a microphone.

4. The system of claim 1, wherein each level of interaction relates to a frequency of vehicle-driver interaction, whereby:
   the highest level of interaction is a highest frequency of vehicle-driver interaction;
   the intermediate level of interaction is an intermediate frequency of vehicle-driver interaction, lower than the highest frequency of vehicle-driver interaction; and
   the lowest level of interaction is a lowest frequency of vehicle-driver interaction, lower than the intermediate frequency of vehicle-driver interaction.

5. The system of claim 1, wherein each level of interaction relates to an amount of vehicle-driver interaction, whereby:
   the highest level of interaction is a highest amount of vehicle-driver interaction;
   the intermediate level of interaction is an intermediate amount of vehicle-driver interaction, lower than the highest amount of vehicle-driver interaction; and
   the lowest level of interaction is a lowest amount of vehicle-driver interaction, lower than the intermediate amount of vehicle-driver interaction.

6. The system of claim 1, wherein the interaction module, in interacting with the driver at each level of interaction, delivers messaging to the driver, whereby:
   the interaction module delivers messaging to the driver most if the minimum autonomous-driving interaction mode is selected;
   the interaction module delivers, if the intermediate autonomous-driving interaction mode is selected, messaging to the driver at an intermediate level, being less than the messaging under the minimum autonomous-driving interaction mode; and
   the interaction module delivers, if the maximum autonomous-driving maximum mode is selected, messaging to the driver at a lowest level, being less than the messaging under the intermediate autonomous-driving interaction mode.

7. The system of claim 6, wherein the messaging at the highest level includes a post-action message comprising feedback information regarding an autonomous-driving action performed by the vehicle.

8. The system of claim 6, wherein the messaging at the highest level includes a pre-action request for approval for an autonomous-driving action for the vehicle.

9. The system of claim 1, wherein the interaction module, in interacting with the driver at each level of interaction, monitors driver activity, whereby:
   the interaction module monitors the driver at a highest level if the minimum autonomous-driving interaction mode is selected;
   the interaction module monitors the driver at an intermediate level, being less than the monitoring under the minimum autonomous-driving interaction mode, if the intermediate autonomous-driving interaction mode is selected; and
   the interaction module monitors the driver at a lowest level, being less than the monitoring under the intermediate autonomous-driving interaction mode, if the maximum autonomous-driving interaction mode is selected.

10. The system of claim 9, wherein:
    the interaction module is configured to, by way of the processing hardware unit, in monitoring the driver, sense a driver communication in monitoring the driver via the tangible interface device; and
    the interaction module is configured to, by way of the processing, determine a responsive operation to perform in response to the driver communication.

11. The system of claim 10, wherein the driver communication comprises at least one expression selected from a group consisting of a gesture, a touch or other manual input, a voice statement, a voice request for vehicle feedback, and another voice expression.

12. The system of claim 10, wherein the responsive operation comprises at least one operation selected from a group consisting of:
    determining an autonomous-driving action based on the driver communication;

providing a system recommendation, based on the driver communication, to perform an autonomous-driving action;

initiating an autonomous-driving action based on the driver communication;

initiating early performance of an autonomous-driving action to alleviate a driver concern indicated by the driver communication; and initiating a transfer of vehicle control, to the system from the driver or to the driver from the system, in response to the driver communication.

13. The system of claim 10, wherein the responsive operation comprises at least one operation selected from a group consisting of:

determining the applicable interaction mode based on the driver communication;

changing the applicable interaction mode based on the driver communication; and proposing an alternative interaction mode based on the driver communication.

14. The system of claim 10, wherein the responsive operation comprises at least one operation selected from a group consisting of:

determining a responsive system message comprising information requested by the driver communication; and determining, based on the driver communication, a responsive message, of said system messages, configured to alleviate a driver concern indicated by the driver communication.

15. The system of claim 10, wherein the responsive operation comprises establishing, based on the driver communication, a driver preference to affect future autonomous-driving actions of the vehicle.

16. The system of claim 1, further comprising a non-transitory computer-readable storage device comprising the mode-determining module, the interaction module, and a driver profile, wherein:

the interaction module, in interacting with the driver at each level of interaction, delivers messaging to the driver; and the interaction module, via the processing hardware unit, determines the messaging based on a pre-established driver preference stored in the driver profile.

17. The system of claim 1, further comprising a non-transitory computer-readable storage device comprising the mode-determining module, the interaction module, and driver driving-style data, wherein:

the interaction module, in interacting with the driver at each level of interaction, delivers messaging to the driver; and the interaction module, via the processing hardware unit, determines the messaging based on the driver driving-style data.

18. The system of claim 1, further comprising a non-transitory computer-readable storage device comprising the mode-determining module, the interaction module, and driver driving-style data, wherein:

the interaction module, in interacting with the driver at each level of interaction, delivers messaging to the driver; and the interaction module, via the processing hardware unit, determines the messaging based on the driver driving-style data.

19. A non-transitory computer-readable storage device, for use at an autonomous-driving-capable vehicle, comprising:

a mode-determining module configured to, via a processing hardware unit, select, from amongst a plurality of pre-established interaction modes, an applicable interaction mode corresponding to a driver of the autonomous-driving-capable vehicle, wherein the plurality of pre-established interaction modes comprise a minimum autonomous-driving interaction mode, an intermediate autonomous-driving interaction mode, and a maximum autonomous-driving mode; and an interaction module configured to, via the processing hardware unit:

interact, by way of a tangible interface device, with the driver at a highest level of interaction if the minimum autonomous-driving interaction mode is selected;

interact, by way of the tangible interface device, with the driver at an intermediate level of interaction, lower than said highest level of interaction, if the intermediate autonomous-driving interaction mode is selected; and interact, by way of the tangible interface device, with the driver at a lowest level of interaction, lower than said intermediate level of interaction, if the maximum autonomous-driving interaction mode is selected.

20. A process, for implementation at an autonomous-driving-capable vehicle, comprising:

selecting, by a processing hardware unit executing a mode-determining module, from amongst a plurality of pre-established interaction modes, an applicable interaction mode corresponding to a driver of the autonomous-driving-capable vehicle, wherein the plurality of pre-established interaction modes comprise a minimum autonomous-driving interaction mode, an intermediate autonomous-driving interaction mode, and a maximum autonomous-driving mode; and interacting, by an interaction module via the processing hardware unit, with the driver by way of a tangible interface device at a highest level of interaction if the minimum autonomous-driving interaction mode is selected;

interacting, by the interaction module via the processing hardware unit, with the driver by way of a tangible interface device at an intermediate level of interaction, lower than said highest level of interaction, if the intermediate autonomous-driving interaction mode is selected; and interacting, by the interaction module via the processing hardware unit, with the driver by way of a tangible interface device at a lowest level of interaction, lower than said intermediate level of interaction, if the maximum autonomous-driving interaction mode is selected.

* * * * *